US008325614B2

(12) United States Patent
Poon et al.

(10) Patent No.: US 8,325,614 B2
(45) Date of Patent: Dec. 4, 2012

(54) SYSTEM AND METHOD FOR CONNECTING, CONFIGURING AND TESTING NEW WIRELESS DEVICES AND APPLICATIONS

(75) Inventors: Terrence Poon, Foster City, CA (US); Scott Potter, Los Gatos, CA (US); Curtis Govan, McKinney, TX (US); Macarlo Namie, San Francisco, CA (US); Paul Lacy, San Jose, CA (US); Amit Gupta, Livermore, CA (US)

(73) Assignee: Jasper Wireless, Inc., Mountain View, CA (US)

( * ) Notice: Subject to any disclaimer, the term of this patent is extended or adjusted under 35 U.S.C. 154(b) by 416 days.

(21) Appl. No.: 12/652,694

(22) Filed: Jan. 5, 2010

(65) Prior Publication Data

US 2011/0164511 A1 Jul. 7, 2011

(51) Int. Cl.
*H04L 1/00* (2006.01)
(52) U.S. Cl. ..................................................... 370/241
(58) Field of Classification Search .................. 370/241, 370/246, 250, 252–253; 455/423–425, 67.11, 455/115.1, 226.1
See application file for complete search history.

(56) References Cited

U.S. PATENT DOCUMENTS

| 7,483,694 | B2 * | 1/2009 | Varanda ........................ 455/423 |
| 2006/0035631 | A1 * | 2/2006 | White et al. .................. 455/418 |
| 2009/0075646 | A1 | 3/2009 | Lohlein et al. |
| 2009/0098867 | A1 | 4/2009 | Varanda |
| 2009/0191857 | A1 | 7/2009 | Horn et al. |

OTHER PUBLICATIONS

International Search Report in a corresponding PCT Application No. PCT/US 11/20092 dated Mar. 8, 2011.

* cited by examiner

*Primary Examiner* — Frank Duong
(74) *Attorney, Agent, or Firm* — Blakely Sokoloff Taylor & Zafman, LLP

(57) ABSTRACT

A system, apparatus, and method are provided for connecting, configuring and testing new wireless devices and applications. For example, one embodiment of a computer-implemented method for enabling a trial wireless device comprises: automatically pre-provisioning one or more trial SIM cards for operation on a particular wireless cellular network on behalf of a prospective customer; automatically pre-configuring a trial wireless machine-to-machine ("M2M") device on behalf of the prospective customer; wherein the trial M2M device includes testing and monitoring program code which, when the trial M2M device is connected to a computer system, performs the operations of: automatically connecting to the wireless cellular network execute a plurality of test operations for testing the SIM card and the trial M2M device, the test operations including determining whether the SIM card is correctly provisioned for the wireless network; determining whether the trial M2M wireless device is operating properly; and determining the existence of wireless data connectivity.

39 Claims, 13 Drawing Sheets

Your Device Info

Module you are using in your device — 601

| MC 8775 PCI Express Mini Card -- Qualcomm/MSM6280/1.1.9.33 ▼ |

Note: You must be using an AT&T certified module or device with appropriate chipset and firmware. See list
Not certified or simply not sure? Please contact us at DevKit@ATT.m2m.com

Contact Information — 602

First Name
| Tom |

Last Name
| Webster |

Phone Number (enter without spaces)
| 408-720-8301 |

Email
| thomas_webster@bstq.com |

Company Name
| Blakely, et al |

Launch Timeframe
| Within 3 months ▼ |

Type of device you are developing
| Computing ▼ |

Devices expected to deploy first year
| 25 |

Enter number, no commas

Account Information — 603

User Name
| tomwebster |

6-25 letters and/or numbers, no spaces

Password
| •••••• |

6-25 characters, any combination of letters/numbers/sysmbols, no space

Confirm Password
| •••••• |

FIG. 6A

Referral Code ← 604

Enter your referral code (optional)
[100SARA]    [Enter]

Payment Information ← 605

Cardholder First Name
[Tom]

Cardholder Last Name
[Webster]

Card Number (enter without spaces)
[480801170021*****]

Security Code
[700        *****]

Expiration
[January ▼] [2013 ▼]

Billing Information ← 606

Street Address
[1279 Oakmead Pkwy]

Street Address 2
[ ]

City / Town
[Sunnyvale]

State
[California ▼]

Zip Code
[95032]

Country
(Sorry, Service is only available in the US)
[United States ▼]

Shipping Information ← 607

Shipping Method
☑ Ship to Billing Address (NOTE: Shipper cannot deliver to a PO Box).

| | Account | | | | | | |
|---|---|---|---|---|---|---|---|
| | | | | | User Profile | Extended Access | Help | Log Out |

Home | Terminals | Billing | Orders | Coverage | Admin | Alerts | Support | Internal | Sales Management Sales Dashboard ← 801

| Edit | | | | | Account | | Search | Clear | 1-3 of 3 | ◁ ▷ | Advanced ▼ |
|---|---|---|---|---|---|---|---|---|---|---|---|
| | | | | | Live Updates: On | Turn Off | | | | | |

| ☐ | ID ▲ | Account | Qualification State | Industry | Devices | Launch Time Frame | Expected Deployment | Referral Code |
|---|---|---|---|---|---|---|---|---|
| ☐ | 1 | Jasper Systems | Qualified | boating | cell phone | soon | 100 subs | 1234 |
| ☐ | 3 | 01 Test Account | Needs Further Qualification | ships | cell phone | never | 5 subs | 1234 |
| ☐ | 5 | Shelly Test1 - ravi6 | Needs Further Qualification | Retail Electronics | cell phone | 6-12 months | 20000 | 123 |

802

Done

FIG. 8

SYSTEM AND METHOD FOR CONNECTING, CONFIGURING AND TESTING NEW WIRELESS DEVICES AND APPLICATIONS

BACKGROUND

1. Field of the Invention

This invention relates generally to the field of wireless network systems. More particularly, the invention relates to an improved architecture and method for connecting, configuring and testing new wireless Machine-to-Machine ("M2M") devices and applications.

2. Description of the Related Art

Virtually all wireless carriers today offer both voice and data services. FIG. 1 illustrates a high level architecture of a wireless service provider 110 communicating with one wireless device 101 using both voice and data channels and communicating with a second wireless device 103 using only a data channel. By way of example, many wireless carriers employ the Global System for Mobile Communications ("GSM") standard to support voice traffic and the General Packet Radio Service ("GPRS") standard to support data traffic over the same wireless network. In such a configuration, voice logic and circuitry 112 shown in FIG. 1 processes the GSM voice traffic and separate data logic and circuitry 111 processes the GPRS data traffic. While some of the embodiments of the invention described below implement the GPRS standard for data services and GSM for voice services, it should be noted that the underlying principles of the present invention are not limited to any particular wireless network protocol.

Using the data channel, wireless devices 101, 103 communicate with external servers 131 such as Web servers, instant messaging servers and email servers via the Internet 120 (or other packet-based data network). One particular type of wireless device 103 configured for data traffic only is a "Machine-to-Machine" (hereinafter "M2M") device. M2M devices are deployed in application-specific telemetry systems to collect data using sensors and transmit the data to a destination such as a server accessible over the Internet (or other data network). In the past, telemetry systems were the exclusive domain of very large well financed organizations. For example, large oil and gas companies and electric utilities, through the use of custom-built, proprietary data networks, were some of the first private organizations to use telemetry. In recent years, however, the cost of access to public wireless data networks has dropped, opening the door for new, cost effective M2M applications including, for example, fleet management, point-of-sale transactions, consumer electronics, healthcare monitoring, security, and surveillance, to name a few.

Even with the decreased cost for wireless data communication, however, the process of customer acquisition and onboarding remains time-consuming and inefficient, requiring a significant amount of manual effort on the part of the prospective customer. In order to develop such applications, a prospective customer must engage with the members of the sales team at the wireless service provider (typically cellular carriers or their resellers) and provide detailed plans, business projections, and technical details just to get started. Once the process is initiated, each step along the way takes a lengthy amount of time and manual effort on the part of multiple individuals inside the service provider organization. For example, it may require a significant amount of time to simply receive usable Subscriber Identity Modules ("SIMs") for testing purposes. Even after receiving usable SIMs from the service provider, the prospective customer still has the daunting task of designing the final product, and very little help is provided to iron out various defects/bugs introduced at this early stage. Moreover, the sales team at the wireless service provider has very little, if any, visibility into how the prospective customer is progressing, often resulting in time wasted chasing poor-quality prospective customers. This process can take many months (typically between 6-18 months) and during this time, both the prospective customer and the service provider waste a lot of time and effort in these discussions.

Consequently, what is needed is a more efficient system and method which addresses the current inefficiencies associated with integrating new customers and new wireless data applications.

BRIEF DESCRIPTION OF THE DRAWINGS

A better understanding of the present invention can be obtained from the following detailed description in conjunction with the following drawings, in which:

FIGS. 6a-b illustrate one embodiment of a trial order Website for collecting user and device data for wireless trial devices.

FIGS. 7a-c illustrates one embodiment of a Web-based graphical user interface employed at a control center.

FIG. 8 illustrates one embodiment of a Web-based graphical user interface employed by a sales management system.

DETAILED DESCRIPTION OF PREFERRED EMBODIMENTS

Described below is a system and method for designing and integrating new wireless data applications on a cellular network. Throughout the description, for the purposes of explanation, numerous specific details are set forth in order to provide a thorough understanding of the present invention. It will be apparent, however, to one skilled in the art that the present invention may be practiced without some of these specific details. In other instances, well-known structures and devices are shown in block diagram form to avoid obscuring the underlying principles of the present invention.

The embodiments of the invention described below reduce the time and cost associated with acquiring new wireless data customers and deploying new wireless applications. In particular, in one embodiment, a Web-based system and method for customer acquisition and onboarding are employed with guides for quality design, efficient techniques for testing, configuring and troubleshooting new wireless devices, and dashboards for monitoring and managing the Web-based distribution channel.

Figure 1:
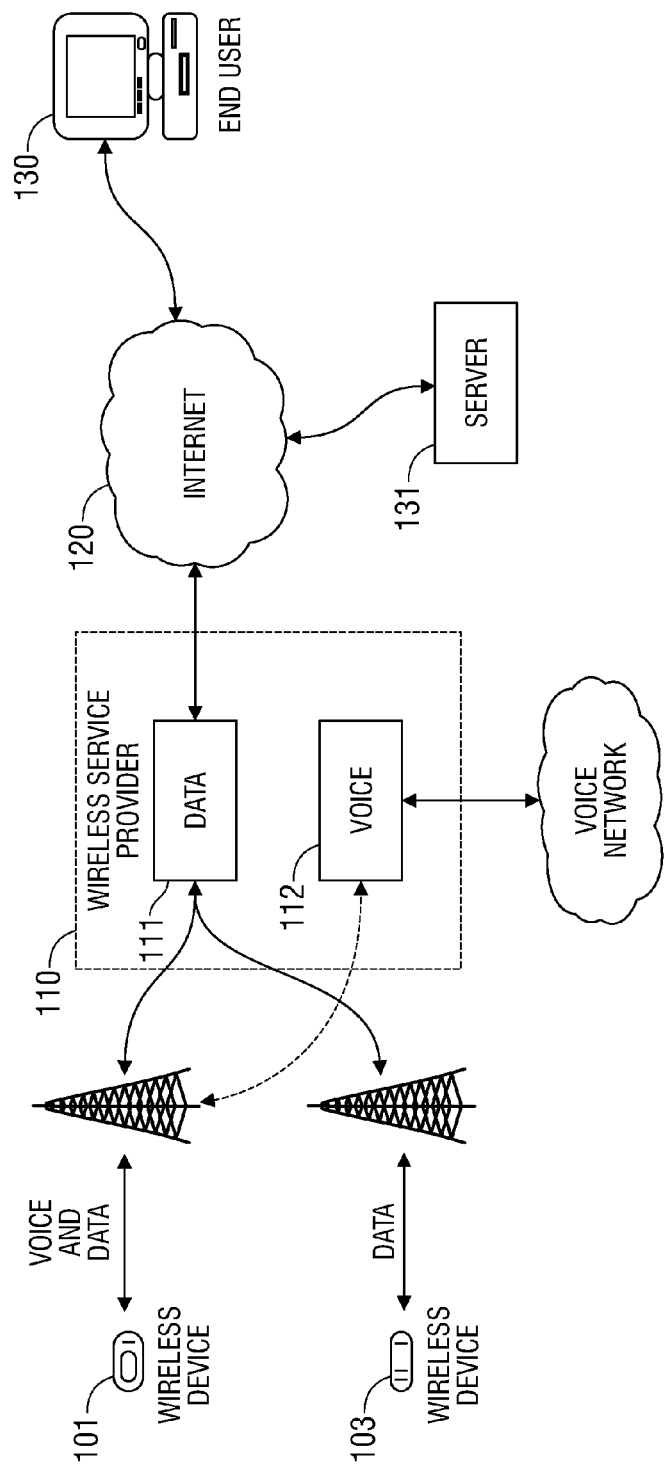
FIG. 1 illustrates an high level architecture of a wireless data and voice system.
Figure 2:
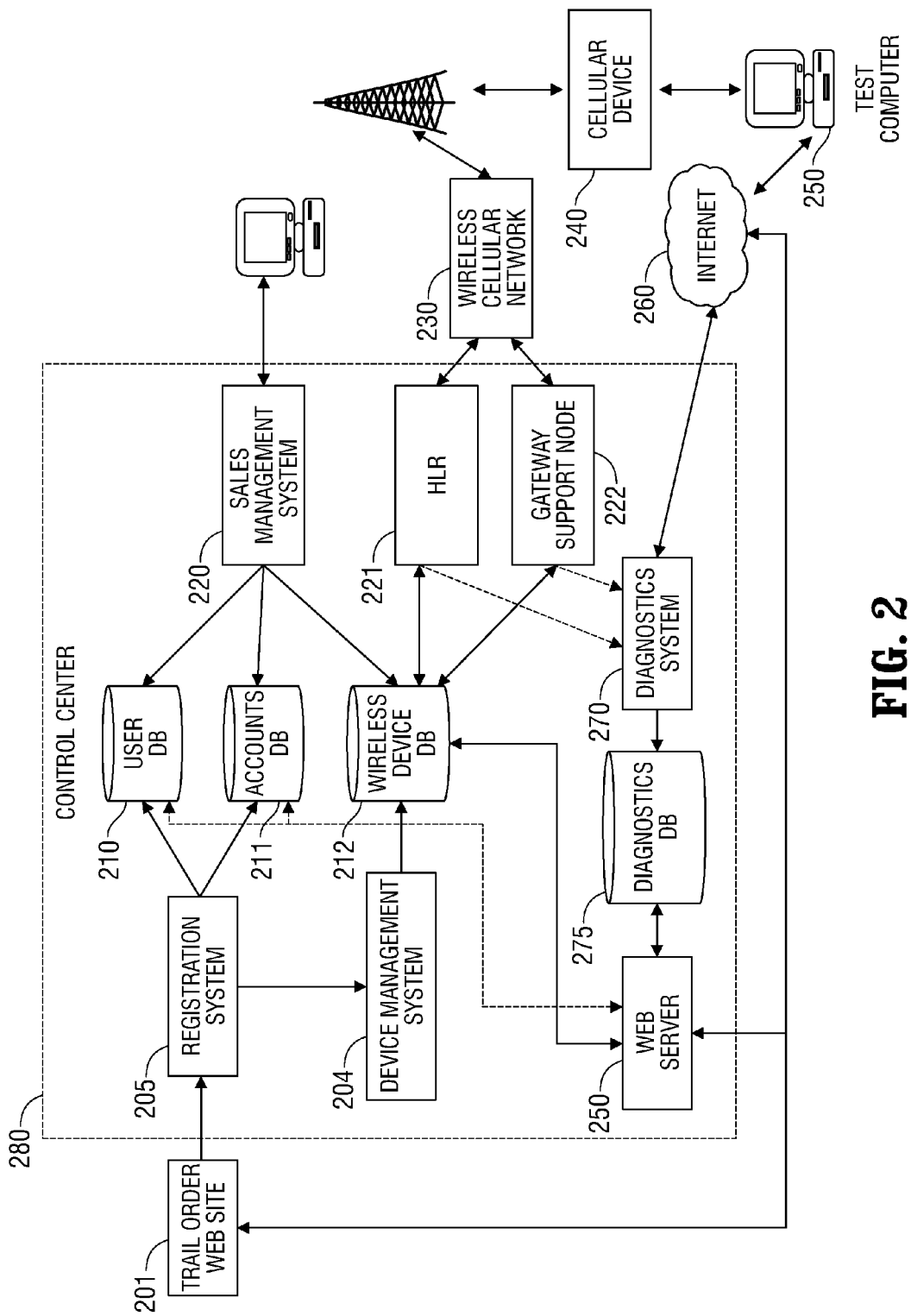
FIG. 2 illustrates a system architecture according to one embodiment of the invention.

A system architecture according to one embodiment of the invention is illustrated in FIG. 2. In this embodiment, a control center 280 is communicatively coupled to a test computer 250 over a wireless network 230 operated by a wireless service provider. The control center 280 may also be coupled to the test computer 250 through an Internet connection 260, if one is available. This Internet connection is sometimes referred to below as a "direct channel" between the Test Computer and the control center 280. The control center 230 includes a plurality of servers for implementing the various functional modules 204-205, 220-222, 270 illustrated in FIG. 2 (e.g., by executing program code designed to perform the various functions). The control center 280 also includes a plurality of databases 210-212 for storing data related to users and wireless devices.

In operation, a prospective wireless data customer visits a trial order Website 201 and requests trial SIMs through a Web-based user interface, certain embodiments of which are illustrated in FIGS. 6*a-b*. As shown in FIG. 6*a*, the Web-based user interface includes a drop-down menu 601 containing a selectable list of wireless modules supported by the wireless service provider. In the illustrated embodiment, the service provider is AT&T and the wireless modules include those wireless modules supported on the AT&T data network. However, the underlying principles of the invention are not limited to any particular service provider. Other information entered in the Web-based user interface include contact information 602 (user name, address, etc), account information 603 (for specifying a user name and password for a new user account), a referral code 604, payment information 605 (e.g., credit card data), billing information 606, and shipping information 607. In one embodiment, the Website 201 includes data verification logic to ensure that the data entered in the various data fields is in the correct data format. In addition, although not shown in the figures, the trial order Website 201 includes a connection to a credit card issuer system to verify the credit card payment information entered by the user. While various different platforms may be used to implement the trial order Website (and other Web-based user interface features described herein), in one embodiment, the Website is an Apache Tomcat web server running on Linux with software programmed in Java using an Oracle database.

Upon entering all requested information, the Website 201 verifies the transaction and transmits the user and device data to a registration system 205. In one embodiment, the registration system 205 exposes an Application Programming Interface (API) to the trial order Website 201 and the trial order Website communicates data to the registration system using the API. The interactions between the Web site and the registration system may be formatted as a Web services-based transaction, with user data embedded in one or more Extensible Markup Language ("XML") files using the SOAP protocol. However, various other data communication protocols may be employed while still complying with the underlying principles of the invention.

In response to receipt of the user data, the registration system 205 establishes a new user account and executes a series of database operations to open new record(s) in a user database 210 and an accounts database 211. For example, the user's name and contact information may be stored in the user database 210 and a new account may be opened for the user in the accounts database 211 (including an account number, wireless device identification codes, etc.). In one embodiment, the various databases shown in FIG. 2 are not actually separate databases but, rather, separate data structures (e.g., tables) within a single relational database.

In one embodiment, a device management system 204 automatically provisions trial SIMs on behalf of the user within a wireless device database 212. As part of the provisioning process, an identification code for each trial SIM is automatically associated with data services offered by the wireless service provider. Each SIM includes a unique serial number, international unique number of the mobile user ("IMSI"), security authentication and ciphering information, temporary information related to the local network, a list of services to which the user is provided access and password data. In one embodiment, the SIMs are initially provisioned with limited "trial" functionality for application development and testing purposes. For example, in one embodiment, data transmission thresholds are set to limit the amount of data which the trial SIMs may utilize during the testing period. In addition, in one embodiment, the SIMs are provisioned to operate only for a specified trial period. At the end of the trial period, the SIMs are automatically disabled and/or de-provisioned and will no longer be permitted access to the wireless service provider network.

As part of the provisioning process, the SIMs are automatically registered with the Home Location Register ("HLR") 221 of the wireless service provider 230. An HLR is a central database containing details of each mobile data subscriber authorized to use the wireless network. While the HLR 221 is illustrated in FIG. 2 within the domain of the control center 280, in one embodiment, the HLR 221 communicates with a central HLR maintained by the wireless service provider. Alternatively, in one embodiment, the entire HLR is maintained by the service provider and the service provider is provided access to the data stored within the wireless device database 212 during the provisioning process. The underlying principles of the invention are not limited to any particular HLR/database configuration.

Figure 3:
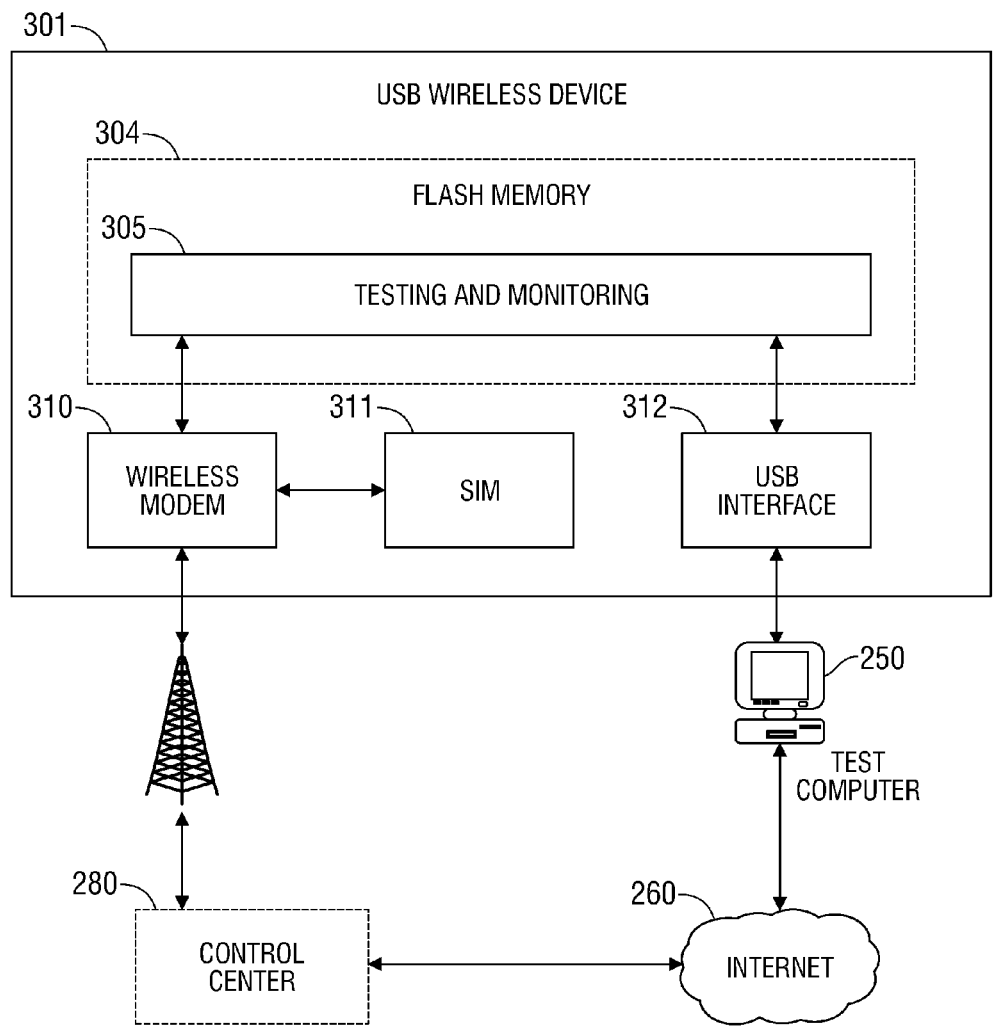
FIG. 3 illustrates one embodiment of a USB test device sent to prospective customers.

Following the automatic provisioning of the trial SIMs and registration of the user, the owner/operator of the control center 280 sends a wireless development kit to the user containing the trial SIMs and an M2M test device with application software for testing and configuration. As illustrated in FIG. 3, one embodiment of the test device comprises a wireless device 301 with a Universal Serial Bus ("USB") interface 312 for connecting to the USB port of a standard computer system 250. However, the underlying principles of the invention are not limited to any particular interface type. Other interface types which may be used in lieu of USB include, by way of example and not limitation, IEEE 1394b ("Firewire") and eSATA. In one embodiment, the computer system 250 is a Windows-based computer with an Intel® Core-2 Duo®, Core i7®, or similar x86-based processor, 2-4 GBytes of DDR2 or DDR3 memory, and a 250 GByte (or larger) Serial ATA hard drive. Various other computer configurations may also be used while still complying with the underlying principles of the invention. For example, in one embodiment, the test computer 250 is a Macintosh® computer system such as a Macbook Pro® or Mac Pro® desktop.

One embodiment of the wireless USB device 301 includes a flash memory 304 for storing testing and monitoring program code 305. The flash memory 304 may be integrated directly within the device or may take the form of a memory card coupled to a memory card slot within the USB device (e.g., a Secure Digital card slot). In one embodiment, the USB device 301 includes a wireless modem module 310 pre-configured to communicate over the wireless network and a SIM interface into which the pre-provisioned trial SIMs may be connected for configuring, testing and debugging wireless applications. Once inserted into the SIM interface, the SIM card 311 authorizes the wireless USB device to communicate over the wireless service provider's network 230 (according to the provisioning parameters associated with the SIM card). In one particular embodiment, the USB device 301 is a Sierra Wireless Compass 885 or 888 which include a wide-area modem for 7.2 Mbps for HSPA networks.

In one embodiment, when the USB device 301 is initially inserted into the USB port of the test computer 250, auto-installation logic (e.g., an automatic installation script) is executed and (upon authorization by the end user), the testing and monitoring program code 305 is automatically installed and executed on the test computer 250.

In one embodiment, the USB device 301 is preconfigured with the Access Point Name ("APN")—i.e., the network address used to identify a Gateway GPRS Support Node ("GGSN") 222 at the control center 280. During the testing and configuration process, all wireless cellular communication with the control center 280 is routed through the GGSN 222. In addition to the APN, the USB device 301 is also configured with the hostname of the control center diagnostics system 270, which includes one or more test servers used for IP traffic testing.

In one embodiment, the provisioning parameters for each SIM includes a communication profile specifying the wireless services allocated to the SIM (e.g., whether Short Message Service ("SMS") or voice functionality are permitted, roaming restrictions, etc). The provisioning parameters also include the rate plan associated with the SIMs including the financial parameters (i.e., the price), the amount of data permitted under the financial parameters, overage rates, etc. As previously described, in one embodiment, each trial SIM is allocated a limited amount of data usage for testing and troubleshooting purposes, and is not provided with voice or SMS communication services. In one embodiment, even though the SIM is not provisioned for voice service, the SIM is provided with GSM functionality in order to be authorized with GSM network, prior to connecting to the GPRS network.

As mentioned above, the testing and monitoring program code 305 automatically establishes a connection with the control center 280 over the wireless cellular network 230 and/or a direct channel through the Internet 260 and executes a series of automated tests, thereby saving the end user a significant amount of time and effort in the process of developing new wireless applications. Moreover, because the SIMs received by the end user are pre-provisioned and the USB device is pre-configured by the control center 280, the USB device is capable of establishing a wireless connection with minimal effort on the part of the prospective customer.

Figure 4:
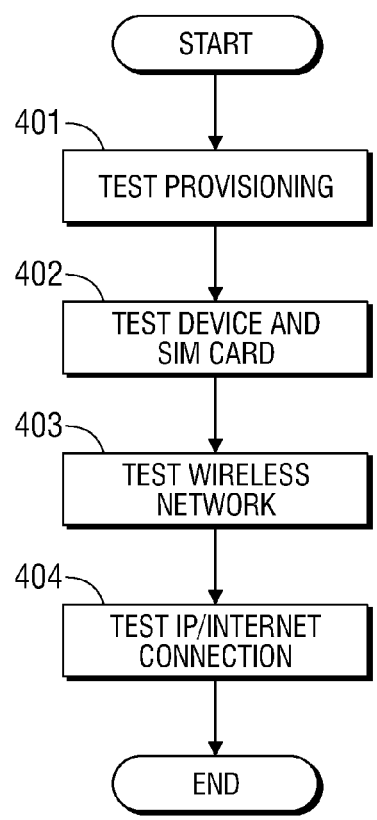
FIG. 4 illustrates a computer-implemented method for connecting, configuring and testing wireless devices.
Figure 5A:
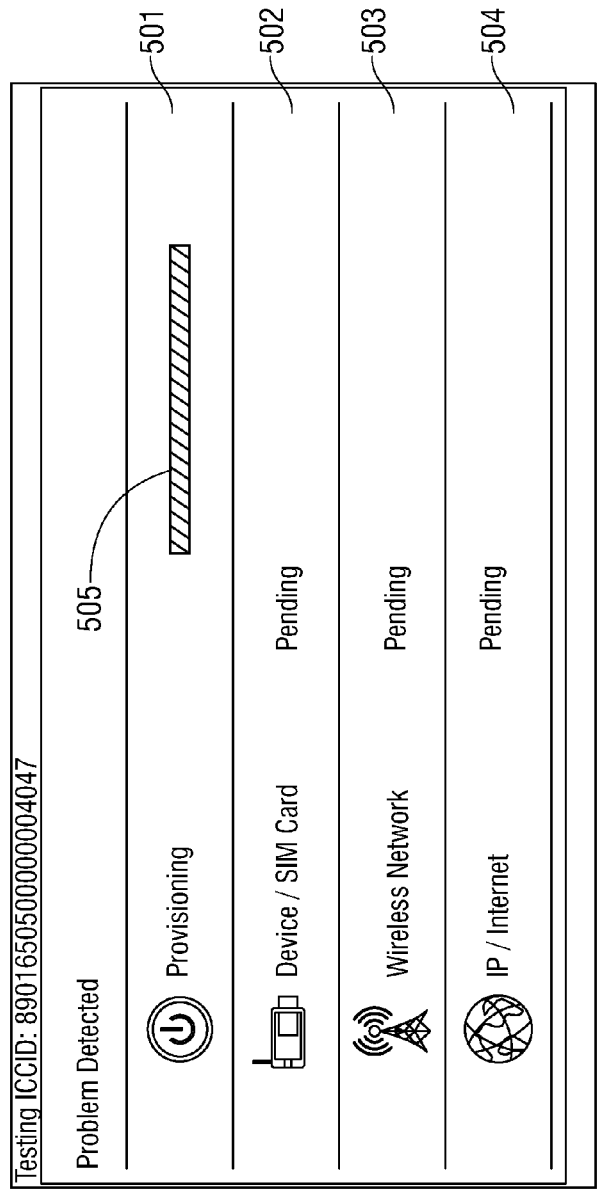
FIGS. 5a-b illustrate one embodiment of a graphical user interface for connecting, configuring and testing wireless devices.
Figure 5B:
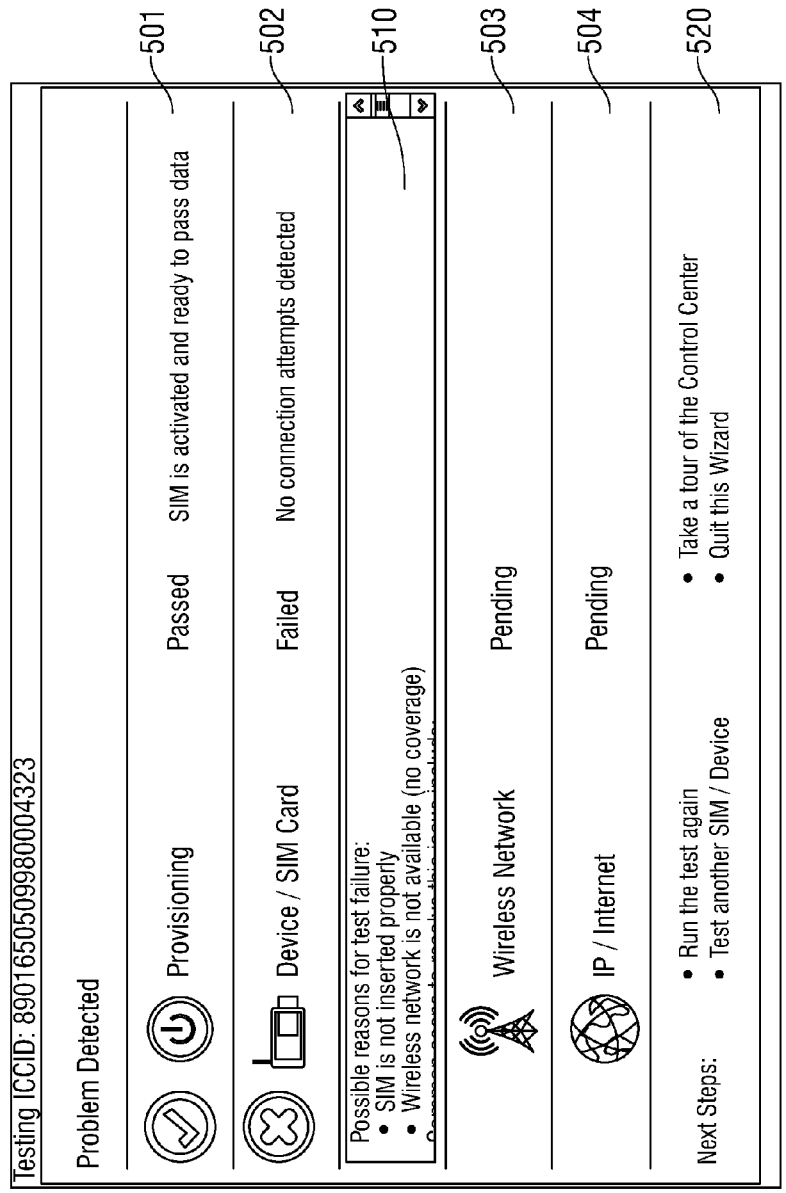

One embodiment of a computer-implemented method for testing, monitoring, and debugging the USB device 301 is illustrated in FIG. 4 and a series of screenshots of a graphical user interface ("GUI") employed by the testing and monitoring program code 305 is illustrated in FIGS. 5a-b.

Turning initially to the method of FIG. 4, at step 401 the testing and monitoring program code 305 tests the provisioning of the USB device 301 with a particular trial SIM installed. In one embodiment, this involves checking the following parameters to determine whether traffic is allowed using the given SIM: (a) the SIM's status must be "Activation Ready" or "Activated;" (b) the SIM must not have been blocked due to excessive signaling activity; and (c) the SIM must not have been blocked due to excessive data usage beyond user-defined overage limits.

Assuming that the foregoing conditions are met, the USB device with the SIM passes the provisioning test step 401. A test failure indicates that one or more of the foregoing conditions were not met. For example, if the SIM's status is not "Activation Ready" or "Activated," or if the SIM has been blocked due to excessive signaling or excessive data usage, then the USB device with the SIM will fail the provisioning step 401. In response, one embodiment of the testing and monitoring program code performs troubleshooting operations to fix the problem and/or notifies the user of troubleshooting steps to be taken. For example, if the SIM's status is not "Active" or "Activation Ready" then the testing and monitoring program may check to ensure that the SIM's status is correctly reflected in the wireless device database 212.

At step 402, the testing and monitoring program code 305 tests the USB device and trial SIM. In one embodiment, this test involves determining whether the given USB device and SIM are available on the network based on one of two factors (whichever comes first): (a) reporting from the device via "direct channel" diagnostics, or (b) any detected wireless signaling activity. With respect to (a), the direct channel comprises the direct connection of the test computer 250 to the diagnostics system 270 through the Internet 260. In one embodiment, the testing and monitoring program code 305 reports its status to the diagnostics system 270 periodically through the direct channel. These reports may include local wireless statistics such as signal strength and data usage. If the device is unable to connect wirelessly due to lack of coverage or low signal strength, the direct channel provides valuable diagnostic information that would otherwise be unavailable to the diagnostics system.

If a direct channel connection or wireless connection are detected, then the USB device and SIM pass the device/SIM testing step 402 illustrated in FIG. 4. In one embodiment, if neither connection is detected, then troubleshooting steps are implemented including instructing the user to confirm that the SIM card 311 is inserted properly and determining whether wireless coverage exists at the test location. For example, in one embodiment, the control center 280 and/or the testing and monitoring program code 305 maintains a database of service coverage locations. If the current location of the wireless device is outside of the coverage location, then the testing and monitoring program code 305 may notify the user that coverage is not available at the current location. The user's current location may be determined manually (e.g., by requesting the current address or zip code for the user) or automatically (using GPS if the user's test computer is equipped with GPS capabilities).

The user may also be asked to verify that the USB device 301 has adequate signal strength (e.g., greater than 1 bar or a RSSI of 5 or more); verify that the device's antenna is properly connected; verify the USB device 301 is configured with the proper frequency bands (850 & 1900 MHz for the US, and 900 & 1800 MHz for Europe); and/or verify whether other wireless devices (e.g., GSM/GPRS cell phones) in the proximity are working. Upon verification of one or more of the above variables, the testing and monitoring program code 305 may re-execute step 402 in FIG. 4 to re-test the USB device/SIM card.

At step 403, the testing and monitoring program code 305 tests the USB device's wireless network connection. In one embodiment, this involves checking the Home Location Register 221 to determine whether there has been any recent wireless signaling from the USB device 301. There are three types of wireless signaling which may be detected: a GSM authorization request; a Mobile Switching Center ("MSC") Location Update; and/or a Serving GPRS Support Node ("SGSN") Location Update. The presence of any of these signaling events indicates that the device has successfully registered on the GSM (voice) network and/or the GP RS (data) network. As such, if any of these signaling events are detected, the testing and monitoring program code 305 indicates that the USB device has passed the wireless network testing step 403 in FIG. 4.

If none of these signaling events are detected, then the testing and monitoring program code 305 may initiate one or more troubleshooting operations. For example, in one embodiment, the control center 280 may transmit an SMS message to the USB device 301. If the SMS message is successful, then GSM service is available (but perhaps not the GPRS service). In addition, the testing and monitoring program code 305 may check the GSM and GPRS registration using AT commands sent to the wireless modem 310 (e.g., to verify GSM registration, the "AT+CREG?" command should return "+CREG:x,1" or "+CREG:x,5"; where "x" is 0, 1 or 2; to verify GPRS registration, the "AT+CGATT?" command should return "+CGATT:1" and "AT+CGREG?" should return "+CGREG:x,1" or "+CGREG:x,5"; where "x" is 0, 1 or 2). Finally, the testing and monitoring program code 305 may perform a soft reset of the USB device 301 or the end user may be prompted to perform a hard reset of the USB device 301.

Returning to FIG. 4, at step 404, the testing and monitoring program code 305 tests the IP/Internet connection of the USB device 301. In one embodiment, this test includes two parts:
  (a) Checking the Gateway GPRS Support Node ("GGSN") to determine whether the USB device 301 has initiated a Packet Data Protocol ("PDP") session. PDP session context data will be present in the Gateway GPRS Support Node (GGSN) when the USB device 301 has established an active session. Consequently, the existence of a PDP session data indicates that the device was able to resolve the Access Point Name ("APN") to a GGSN and start a PDP session with that GGSN.
  (b) Running test traffic from the USB device 301 to a control center test server within the diagnostics system 270 and checking the GGSN for real-time IP traffic statistics. This test fails if the device has no upload/download bytes at all (which suggests a problem with the USB device's IP capabilities) or if it has upload bytes but no download bytes (which suggests a problem reaching the test server).

Assuming that the above conditions are met, the testing and monitoring program code 305 confirms that the USB device 301 has passed the IP/Internet test step 404. If these conditions have not been met, the possible reasons include: the APN is not configured properly; the USB device is unable to open ports or sockets; the IP address is incorrect; and/or the IP data cannot flow bi-directionally.

In one embodiment, the testing and monitoring program code 305 automatically performs the following troubleshooting operations and/or instructs the user to manually perform these operations:
  (a) Check whether the USB device 301 has been configured with the correct APN.
  (b) Verify that all sockets and ports on the USB device 301 are closed and free to use.
  (c) Verify that the destination IP address programmed in the USB device 301 is accurate.

In one embodiment, the results of all of the foregoing tests and troubleshooting steps are stored within a diagnostics database 275. If necessary, the results may be reviewed by personnel within the control center 280 to provide guidance to the prospective customer when troubleshooting new wireless applications. In one embodiment, local environment statistics are transmitted to the diagnostics database 275 such as wireless signal strength of the trial device. The local environment statistics (and other test data) are then usable for performing diagnostics for the trial device and/or aggregated across different trial devices to construct an estimate of the conditions in a given geographical area.

One embodiment of the invention is implemented on an independent, stand-alone wireless device such as a Windows Mobile device. In this embodiment, the trial SIM may be installed and the testing and monitoring software may be executed directly on the independent mobile device (e.g., loaded from non-volatile to volatile memory and executed by the mobile device's processor). Consequently, there is no need for an additional computer system in this implementation.

Moreover, in one embodiment, the testing and monitoring software automatically checks for updates prior to executing the various tests and troubleshooting steps described above. The updates may include patches and additional tests/troubleshooting operations. If an update is available, the testing and monitoring software automatically installs the update (upon confirmation by the end user) and then executes the tests.

FIGS. 5*a-b* illustrate a graphical user interface ("GUI") employed by the testing and monitoring program code 305 with graphical elements 501-504 corresponding to steps 401-404 illustrated in FIG. 4. Each graphical element provides an indication of progress of its corresponding step. For example, in FIG. 5*a*, graphical element 501 corresponding to the provisioning step 401 generates a graphical progress bar to show the progress of the provisioning step.

As each step in the test script is completed, an indication of the results is provided within each graphical element 501-504. For example, in FIG. 5*b*, a "Passed" indication is provided within graphical element 501 (to indicate that the USB device passed the provisioning step 401) and a "Failed" indication is provided within graphical element 502 (to indicate that the USB device failed the device/SIM step 502). In the event that the USB device fails one of the test steps, a scrollable window 510 is generated within the graphical element corresponding to the failed step to provide troubleshooting information to the end user. For example, in response to the failure of the device/SIM card test, troubleshooting instructions are provided to the end user to help determine the problem.

As illustrated in FIG. 2, one embodiment of the control center includes a Web server 250 which dynamically generates a Web-based graphical user interface for monitoring and managing wireless devices which have been added to the system (e.g., following the testing and troubleshooting techniques described above). Using the Web-based GUI, customers and potential customers are provided with comprehensive access to all data stored in the wireless device database 212 and the diagnostics database 275. This information may be used to monitor, manage, and troubleshoot wireless devices. As shown in FIG. 5*b*, in one embodiment, a link 520 to the Web server is provided in the testing window to provide quick access to the control center Web server 250.

Figure 7A:
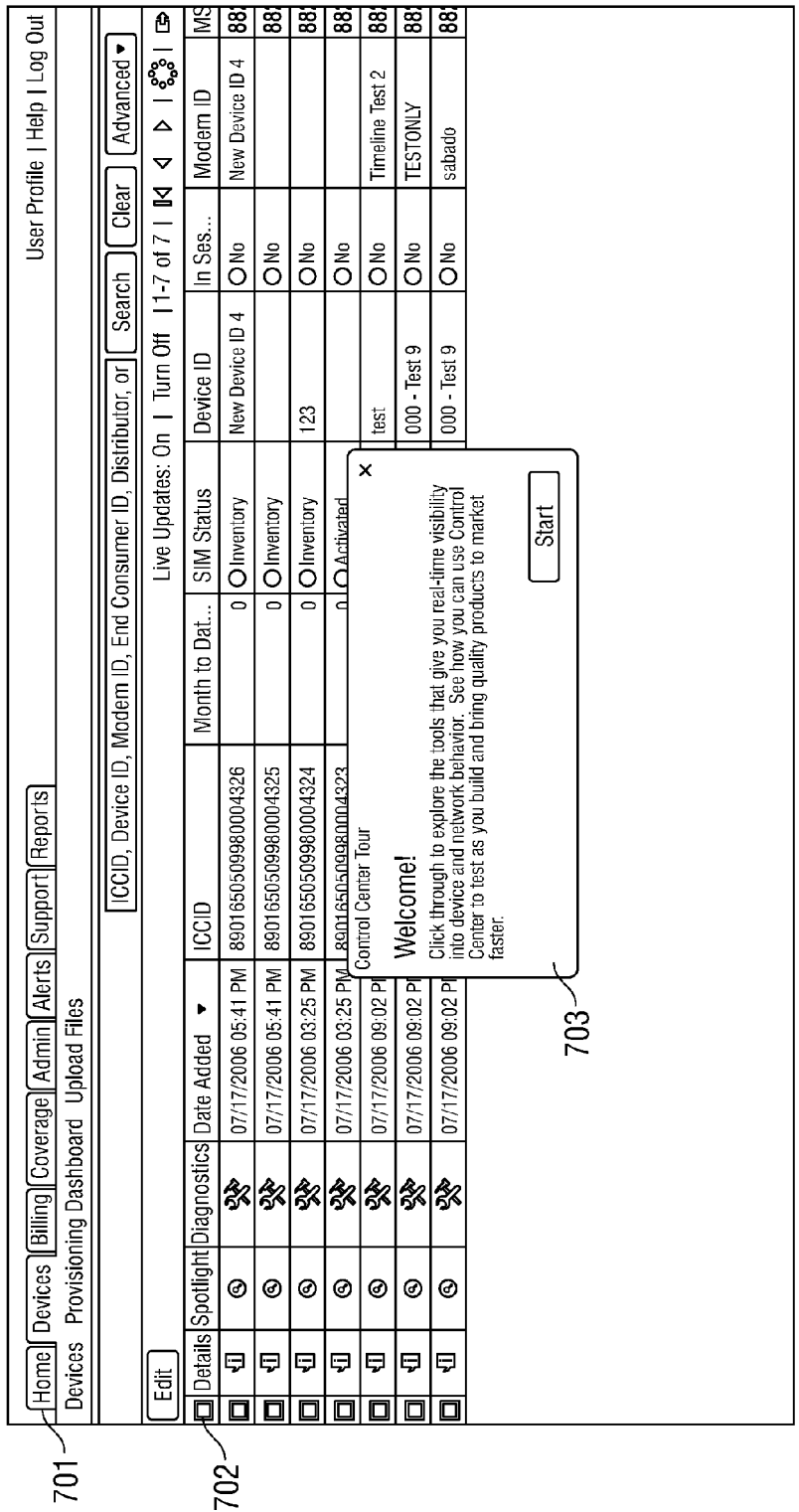
Figure 7B:
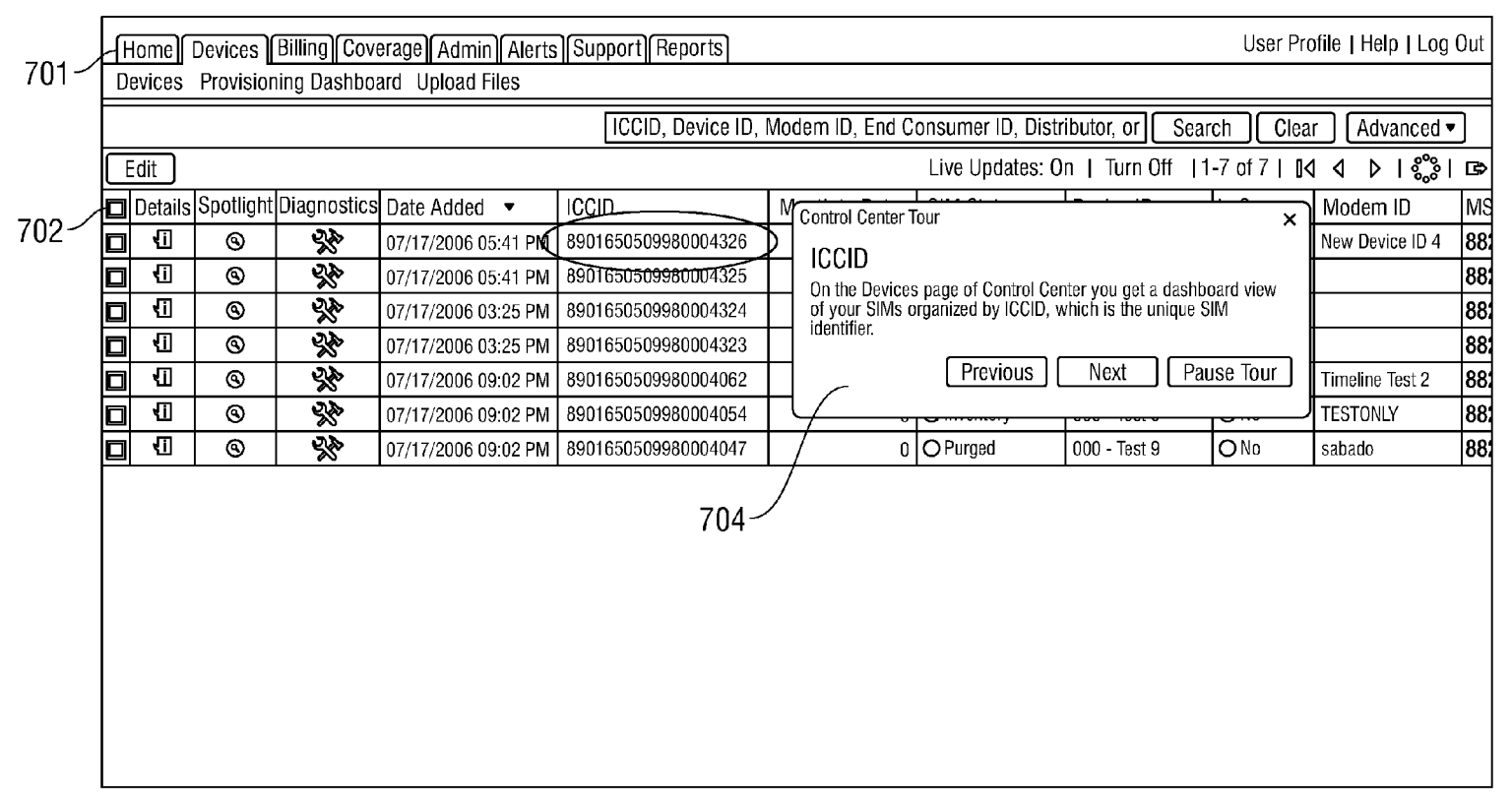
Figure 7C:
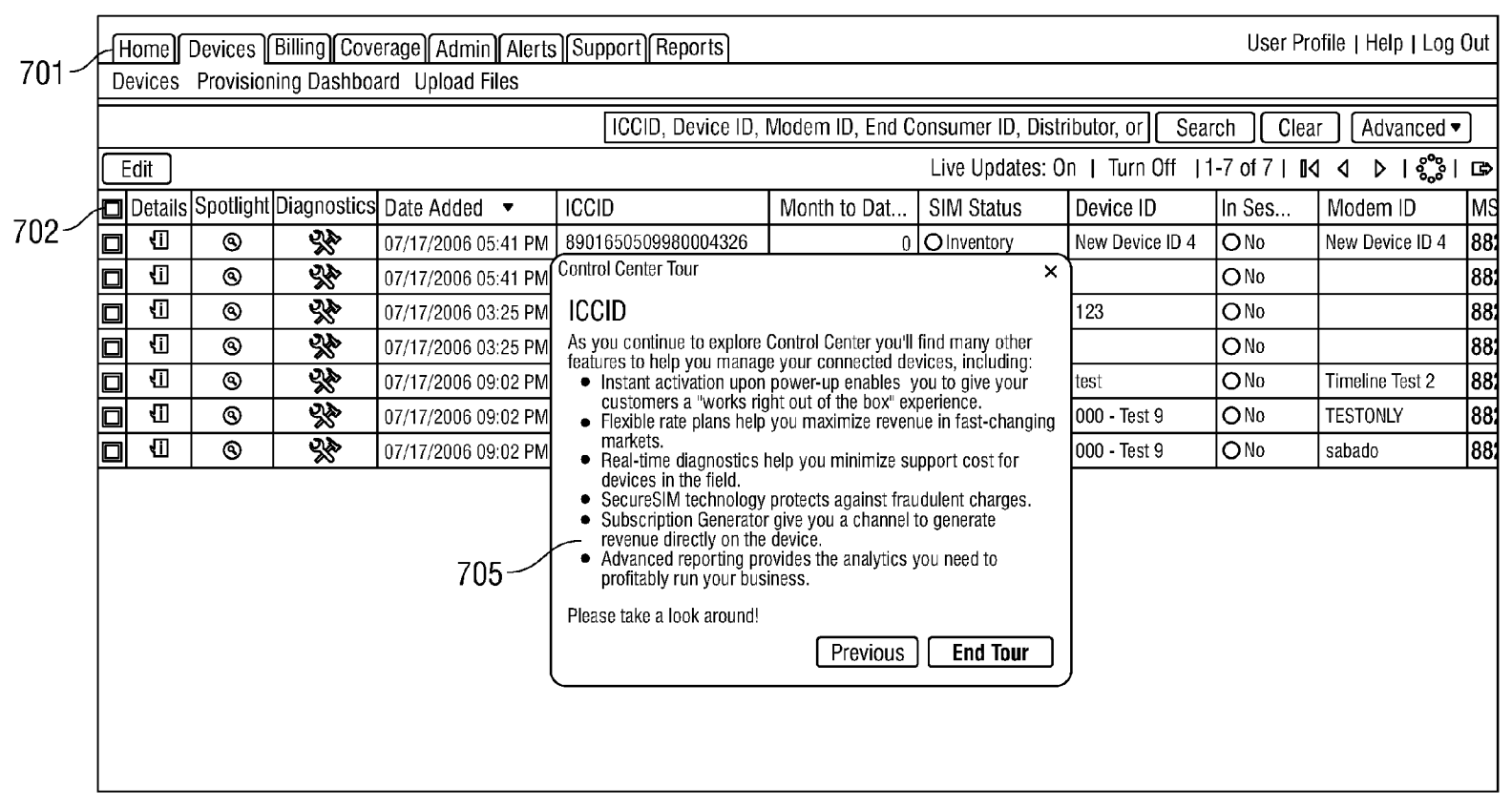

As illustrated in FIGS. 7*a-c*, in one embodiment, the user is initially provided with a "tour" of the control center Website. The tour includes a sequence of informational windows 703-705 identifying various aspects of the control center, with certain features of the control center GUI displayed behind the informational windows. As shown in FIGS. 7*a-c*, a series of selectable tabs 701 are provided at the top of the control center GUI to enable a customer or potential customer to efficiently identify information related to the customer's wireless devices. In the specific embodiment illustrated, the tabs include wireless devices, billing information, device coverage information, account information, alerts, support, and reports.

In the embodiments show in FIGS. 7*a-c*, the "devices" tab is selected, thereby generating a table containing information related to each of the customer's wireless devices. Specifically, as indicated in column headings 702, the information includes the SIM identification code for each wireless device ("ICCID"). The status associated with each wireless device (e.g., an indication as to whether the SIM device has been activated), a device ID code, an indication as to whether the device is currently connected to the control center, the date each wireless device was added to the system, and a modem ID uniquely identifying the wireless modem 310 used on each device. Links are also provided to provide access to diagnostics for each wireless device and a "spotlight" feature which provides detailed connectivity information for each device (e.g., when and where different connectivity events occurred). The "spotlight" feature is described in Co-Pending patent application Ser. No. 12/387,962, entitled "Virtual Diagnostic System for Wireless Communications Network Systems", filed on May 7, 2009, which is assigned to the assignee of the present application and which is incorporated herein by reference.

Once a trial USB device is preconfigured and pre-provisioned as described above, a sales management team at the control center 280 is provided with access to the user, account, and device databases 210-212 through the sales management system 220 illustrated in FIG. 2. FIG. 8 illustrates a Web-based graphical user interface employed by one embodiment of the sales management system 220 in which a "sales management" tab is provided to access the sales management data. In FIG. 8, the sales management tab is selected, thereby generating a table with each row representing a different account and each column containing different variables associated with each customer or potential customer. Specifically, as indicated in column headings 802, the information provided under the sales management tab includes the account name and identification code, the lead qualification state (used to classify whether the trial has the potential to become a paying customer—e.g. qualified, unqualified, potential at later date, etc.), the industry of the customer (e.g., boating, ships, retail electronics, fleet management, healthcare, etc.), the device types employed by the customer (e.g., cell phones, M2M devices, etc.), the launch timeframe indicated by the customer, the expected deployment numbers (e.g., number of M2M units), and a referral code. It should be noted that various additional or alternative data may be provided to the sales management team via the graphical user interface while still complying with the underlying principles of the invention.

Figure 9:
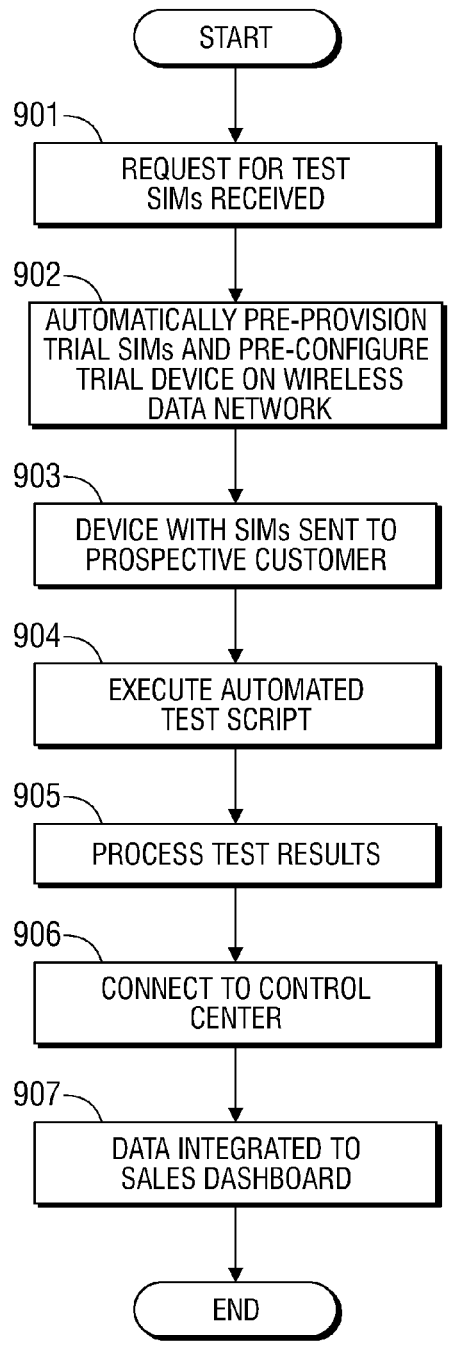
FIG. 9 illustrates one embodiment of a computer-implemented method for establishing new user accounts, testing trial devices and managing user data.

A computer-implemented method according to one embodiment of the invention is illustrated in FIG. 9. Various aspects of the method have already been described with respect to the system shown in FIGS. 2-3. However, the underlying principles of the computer-implemented method are not limited to any particular system configuration. In fact, the computer-implemented method illustrated in FIG. 9 may be implemented on virtually any computing platform.

As indicated at step 901, a prospective wireless data customer initially requests trial SIMs via a Web-based user interface by entering contact information, billing information and information related to the prospective customer's wireless data requirements. At 902, the SIMs are automatically pre-provisioned and the trial device is pre-configured to operate on the wireless data network. At 903, trial SIMs, hardware, and software are sent to the prospective customer to enable the prospective customer to efficiently develop a wireless data solution. In one embodiment, the trial hardware includes a test device with a computer interface (e.g., a USB interface) and the trial software comprises a testing and monitoring application configured to be automatically installed and executed when the test device is plugged into the interface of a prospective customer's computer system.

At 904, the test software executes an automated test script to perform a plurality of tests on the USB device with a particular SIM installed. In one embodiment, the tests include (1) a provisioning test to confirm that the trial device/SIM are correctly provisioned for the wireless network; (2) a device/SIM card test to test the operation of the trial device and SIM; (3) a wireless network test to confirm operation of the trial device on the wireless network; and (4) an IP/Internet test to test Internet connectivity of the trial device. Details associated with some embodiments of these tests are provided above.

At 905, the test results are processed. In the event of a test failure, various troubleshooting steps may be taken automatically or may be proposed to the customer (e.g., as described above). The results of each of the tests are stored within the diagnostics database 275 at the control center 280 (assuming that network connectivity to the control center 280 exists).

At step 906, the prospective customer is automatically directed to the control center Website 250 for a tour of the control center. Some embodiments of the Web-based GUI are described above with respect to FIGS. 7*a-c*. Finally, at step 907, the wireless device data is provided to the sales management team at the control center 280 where it may be used to manage data of prospective customers. One embodiment of a Web-based GUI for providing this information to the sales management team is described above with respect to FIG. 8.

In one embodiment, the Web server platform used to implement the Web-based embodiments of the invention is an Apache Tomcat web server running on Linux with software programmed in Java using an Oracle database.

Embodiments of the invention may include various steps as set forth above. The steps may be embodied in machine-executable instructions which cause a general-purpose or special-purpose processor to perform certain steps. Alternatively, these steps may be performed by specific hardware components that contain hardwired logic for performing the steps, or by any combination of programmed computer components and custom hardware components.

Elements of the present invention may also be provided as a machine-readable medium for storing the machine-executable instructions. The machine-readable medium may include, but is not limited to, floppy diskettes, optical disks, CD-ROMs, and magneto-optical disks, ROMs, RAMs, EPROMs, EEPROMs, magnetic or optical cards, propagation media or other type of media/machine-readable medium suitable for storing electronic instructions. For example, the present invention may be downloaded as a computer program which may be transferred from a remote computer (e.g., a server) to a requesting computer (e.g., a client) by way of data signals embodied in a carrier wave or other propagation medium via a communication link (e.g., a modem or network connection).

Throughout the foregoing description, for the purposes of explanation, numerous specific details were set forth in order to provide a thorough understanding of the invention. It will be apparent, however, to one skilled in the art that the invention may be practiced without some of these specific details. For example, it will be readily apparent to those of skill in the art that the functional modules such as wizards and other logic described herein may be implemented as software, hardware or any combination thereof. Accordingly, the scope and spirit of the invention should be judged in terms of the claims which follow.

What is claimed is:

1. A computer-implemented method for enabling a wireless device comprising:
    automatically pre-provisioning one or more SIM cards for operation on a particular wireless cellular network on behalf of a user;

automatically pre-configuring a wireless machine-to-machine ("M2M") device on behalf of the user, the M2M device includes testing program code which connects to the wireless cellular network and executes a plurality of test operations for testing the M2M device and the one or more SIM cards, wherein the testing program code performs the additional operations of automatically establishing a network connection to a remote diagnostics system, utilizing the network connection during the plurality of test operations, and transmitting results of the plurality of test operations to a server on the remote diagnostics system, the results usage for troubleshooting problems with the M2M device.

2. The method as in claim 1 wherein the M2M device comprises an interface for connecting to a computer system and wherein, when the M2M device is connected to a computer system, the testing program code performs the operations of: automatically connecting to the wireless cellular network and executing a plurality of test operations for testing the SIM card and the M2M device, the test operations including determining whether the SIM card is correctly provisioned for the wireless network; determining whether the M2M wireless device is operating properly; and determining the existence of wireless data connectivity.

3. The method as in claim 1 wherein the testing program code is further configured to verify Internet Packet (IP) network connectivity of the M2M device.

4. The method as in claim 2 wherein the M2M device comprises a Universal Serial Bus ("USB") interface for connecting to the a USB port of the computer system.

5. The method as in claim 4 wherein the testing program code comprises auto-installation logic for automatically attempting to install and execute on the computer system when the M2M wireless device is connected to the USB port of the computer system.

6. The method as in claim 1 wherein pre-provisioning one or more SIM cards comprises registering the one or more SIM cards with a Home Location Register ("HLR") of the service provider of the wireless cellular network.

7. The method as in claim 6 wherein pre-provisioning further comprises pre-configuring a communication profile specifying the wireless services allocated to the SIM card and/or a rate plan associated with the SIM card.

8. The method as in claim 1 wherein pre-configuring the M2M device further comprises pre-installing an access point name ("APN") for identifying a particular Gateway GPRS Support Node on the wireless cellular network.

9. The method as in claim 8 wherein pre-configuring the M2M device further comprises pre-installing a hostname of a diagnostics server for running one or more network traffic tests with the M2M device.

10. The method as in claim 1 wherein the devices and SIMs are integrated with a sales management system, allowing salespeople to track the progress of the SIMs and devices, add descriptive notes about each SIM, and classify each SIM according to attributes such as the lead qualification state, the industry, the launch timeframe, and the expected deployment numbers.

11. The method as in claim 1 wherein automatically establishing a network connection comprises: establishing an direct Internet communication channel between the M2M device and the diagnostics system; and/or establishing a communication channel between the M2M device and the diagnostics system over the wireless cellular network.

12. The method as in claim 1 wherein the testing program code performs the additional operations of: automatically directing the user to a Website coupled to the diagnostics system, the Website providing the user with a Web-based graphical user interface ("GUI") for reviewing test data associated with the plurality of tests and connection data associated with connectivity of the M2M device, and providing additional diagnostics tests for testing the M2M device.

13. A wireless machine-to-machine ("M2M") device comprising:
   a subscriber identity module ("SIM") interface;
   a SIM card communicatively coupled to the SIM interface, the SIM card pre-provisioned to communicate over a wireless service provider network;
   a wireless modem pre-configured to transmit and receive data over the wireless service provider network;
   a computer communications interface for communicatively coupling the M2M device to a computer system;
   a non-volatile memory for storing testing program code for performing testing and monitoring operations;
   auto-installation logic for automatically installing the testing program code when the wireless M2M device is initially coupled to the computer system through the communications interface, the testing program code is configured to execute a plurality of test operations for testing the SIM card and the M2M device upon installation on the computer system, the test operations including determining whether the SIM card is correctly provisioned for the wireless network, determining whether the M2M wireless device is operating properly, and determining the existence of wireless data connectivity, wherein the testing program code, when executed by the computer system, transmits results of the plurality of test operations to a control center comprising one or more servers, the control center including a diagnostics database for storing the results of the test operations and a Web-based user interface to access and review the results of the test operations.

14. The M2M device as in claim 13 wherein the testing program code automatically updates itself over the Internet with new functionality.

15. The M2M device as in claim 13 wherein the testing program code verifies device connectivity with the wireless network by checking the Home Location Register for recent wireless signaling activity including a GSM authorization request, an MSC Location Update, and/or an SGSN Location Update.

16. The M2M device as in claim 15 wherein the testing program code is further configured to verify Internet Packet (IP) network connectivity of the M2M device.

17. The M2M device as in claim 16 wherein the testing program code verifies IP connectivity by checking the GGSN for real-time IP traffic statistics and diagnosing problems based on a detected pattern of upload bytes and download bytes.

18. The M2M device as in claim 13 wherein the computer communications interface comprises a Universal Serial Bus ("USB") interface for connecting to the a USB port of the computer system.

19. The M2M device as in claim 13 wherein pre-provisioning of the SIM card comprises registering the SIM card with a Home Location Register ("HLR") of the service provider of the wireless cellular network.

20. The M2M device as in claim 19 wherein pre-provisioning further comprises pre-configuring a communication profile specifying the wireless services allocated to the SIM card and/or a rate plan associated with the SIM card.

21. The M2M device as in claim 13 wherein the M2M device's non-volatile memory is pre-configured with an access point name ("APN") for identifying a particular Gateway GPRS Support Node on the wireless cellular network.

22. The M2M device as in claim 13 wherein the M2M device's non-volatile memory is pre-configured with a hostname of a diagnostics server for running one or more network traffic tests with the M2M device.

23. A wireless machine-to-machine ("M2M") device comprising:
a subscriber identity module ("SIM") interface;
a SIM card communicatively coupled to the SIM interface, the SIM card pre-provisioned to communicate over a wireless service provider network;
a wireless modem pre-configured to transmit and receive data over the wireless service provider network;
a computer communications interface for communicatively coupling the M2M device to a computer system;
a non-volatile memory for storing testing program code for performing testing and monitoring operations; and
auto-installation logic for automatically installing the testing program code when the wireless M2M device is initially coupled to the computer system through the communications interface, the testing program code is configured to execute a plurality of test operations for testing the SIM card and the M2M device upon installation on the computer system, the test operations including determining whether the SIM card is correctly provisioned for the wireless network, determining whether the M2M wireless device is operating properly, and determining the existence of wireless data connectivity, wherein the testing program code performs the additional operations of automatically establishing a network connection to a remote diagnostics system,
utilizing the network connection during the plurality of test operations,
and transmitting results of the plurality of test operations to a server on the remote diagnostics system, the results usable for troubleshooting problems with the M2M device.

24. The M2M apparatus device as in claim 23 wherein the testing program code performs the additional operations of: automatically directing the user to a Website coupled to the diagnostics system, the Website providing a user with a Web-based graphical user interface ("GUI") for reviewing test data associated with the plurality of tests and connection data associated with connectivity of the M2M device over the wireless network, and providing additional diagnostics tests for testing the M2M device.

25. The M2M device as in claim 23 wherein automatically establishing a network connection comprises: establishing a direct Internet communication channel between the M2M device and the diagnostics system; and/or establishing a communication channel between the M2M device and the diagnostics system over the wireless cellular network.

26. The M2M device as in claim 23 wherein the device sends local environment statistics such as wireless signal strength to the remote diagnostics system, wherein the local environment statistics are usable for performing diagnostics for the M2M device and/or aggregated across different M2M devices to construct an estimate of the conditions in a given geographical area.

27. A wireless machine-to-machine ("M2M") device comprising:
a subscriber identity module ("SIM") interface;
a SIM card communicatively coupled to the SIM interface, the SIM card pre-provisioned to communicate over a wireless service provider network;
a wireless modem pre-configured to transmit and receive data over the wireless service provider network;
a non-volatile memory for storing testing program code for performing testing and monitoring operations;
a volatile memory for storing a runtime instance of the testing program code; and
a processor for processing the testing program code to execute a plurality of test operations for testing the SIM card and the M2M device, the test operations including determining whether the SIM card is correctly provisioned for the wireless network, determining whether the M2M wireless device is operating properly, and determining the existence of wireless data connectivity, wherein the testing program code, when executed by the processor, transmits results of the plurality of test operations to a control center comprising one or more servers, the control center including a diagnostics database for storing the results of the test operations and a Web-based user interface to access and review the results of the test operations.

28. The M2M device as in claim 27 wherein the testing program code automatically updates itself over the Internet with new functionality.

29. The M2M device as in claim 27 wherein the M2M device's non-volatile memory is pre-configured with a hostname of a diagnostics server for running one or more network traffic tests with the M2M device.

30. The M2M device as in claim 27 wherein the testing program code verifies device connectivity with the wireless network by checking the Home Location Register for recent wireless signaling activity including a GSM authorization request, an MSC Location Update, and/or an SGSN Location Update.

31. The M2M device as in claim 30 wherein the testing program code is further configured to verify Internet Packet (IP) network connectivity of the M2M device.

32. The M2M device as in claim 31 wherein the testing program code verifies IP connectivity by checking the GGSN for real-time IP traffic statistics and diagnosing problems based on a detected pattern of upload bytes and download bytes.

33. The M2M device as in claim 27 wherein pre-provisioning of the SIM card comprises registering the SIM card with a Home Location Register ("HLR") of the service provider of the wireless cellular network.

34. The M2M device as in claim 33 wherein pre-provisioning further comprises pre-configuring a communication profile specifying the wireless services allocated to the SIM card and/or a rate plan associated with the SIM card.

35. The M2M device as in claim 27 wherein the M2M device's non-volatile memory is pre-configured with an access point name ("APN") for identifying a particular Gateway GPRS Support Node on the wireless cellular network.

36. A wireless machine-to-machine ("M2M") device comprising:
a subscriber identity module ("SIM") interface;
a SIM card communicatively coupled to the SIM interface, the SIM card pre-provisioned to communicate over a wireless service provider network;
a wireless modem pre-configured to transmit and receive data over the wireless service provider network;
a non-volatile memory for storing testing program code for performing testing and monitoring operations;
a volatile memory for storing a runtime instance of the testing program code; and
a processor for processing the testing program code to execute a plurality of test operations for testing the SIM card and the M2M device, the test operations including determining whether the SIM card is correctly provisioned for the wireless network, determining whether the M2M wireless device is operating properly, and determining the existence of wireless data connectivity, wherein the testing program code performs the additional operations of automatically establishing a network connection to a remote diagnostics system, utilizing the network connection during the plurality of test operations, and transmitting results of the plurality of test operations to a server on the remote diagnostics system, the results usable for troubleshooting problems with the M2M device.

37. The M2M device as in claim 36 wherein the testing program code performs the additional operations of: automatically directing the user to a Website coupled to the diagnostics system, the Website providing a user with a Web-based graphical user interface ("GUI") for reviewing test data associated with the plurality of tests and connection data associated with connectivity of the M2M device over the wireless network, and providing additional diagnostics tests for testing the M2M device.

38. The M2M device as in claim 36 wherein the device sends local environment statistics such as wireless signal strength to the remote diagnostics system, wherein the local environment statistics are usable for performing diagnostics for the M2M device and/or aggregated across different M2M devices to construct an estimate of the conditions in a given geographical area.

39. The M2M device as in claim 36 wherein automatically establishing a network connection comprises: establishing a direct Internet communication channel between the M2M device and the diagnostics system; and/or establishing a communication channel between the M2M device and the diagnostics system over the wireless cellular network.

* * * * *